United States Patent
Lloyd

(10) Patent No.: US 10,108,158 B2
(45) Date of Patent: *Oct. 23, 2018

(54) WEAKLY-TYPED DATAFLOW INFRASTRUCTURE WITH STANDALONE, CONFIGURABLE CONNECTIONS

(71) Applicant: ROCKWELL AUTOMATION TECHNOLOGIES, INC., Mayfield Heights, OH (US)

(72) Inventor: Robert F. Lloyd, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 603 days.

This patent is subject to a terminal disclaimer.

(21) Appl. No.: 14/624,049

(22) Filed: Feb. 17, 2015

(65) Prior Publication Data

US 2015/0160637 A1    Jun. 11, 2015

Related U.S. Application Data

(63) Continuation of application No. 12/239,225, filed on Sep. 26, 2008, now Pat. No. 8,959,439.

(51) Int. Cl.
| | |
|---|---|
| G06F 9/44 | (2018.01) |
| G05B 15/02 | (2006.01) |
| G06F 3/048 | (2013.01) |
| G05B 19/042 | (2006.01) |

(52) U.S. Cl.
CPC ......... G05B 15/02 (2013.01); G05B 19/0426 (2013.01); G06F 3/048 (2013.01); *G05B 2219/23258* (2013.01); *G05B 2219/23276* (2013.01)

(58) Field of Classification Search
None
See application file for complete search history.

(56) References Cited

U.S. PATENT DOCUMENTS

| | | | | |
|---|---|---|---|---|
| 7,024,631 B1* | 4/2006 | Hudson | ..................... | G06F 8/34 715/762 |
| 2005/0177816 A1* | 8/2005 | Kudukoli | .................. | G06F 8/34 717/105 |
| 2006/0117302 A1* | 6/2006 | Mercer | ................. | G06F 9/4425 717/131 |
| 2008/0018511 A1* | 1/2008 | Leonard | ............. | H03H 17/0294 341/144 |
| 2013/0178984 A1* | 7/2013 | Xu | ......................... | G05B 19/00 700/275 |

* cited by examiner

*Primary Examiner* — Philip Wang
(74) *Attorney, Agent, or Firm* — Fletcher Yoder, P.C.

(57) ABSTRACT

In one embodiment, an industrial automation device having a visual component is provided that includes a user viewable screen displaying a visual representation of a first object, wherein the first object comprises a plurality of properties, connections, and text associated with the object, second object, wherein the second object comprises a plurality of properties, connections, and text, and wherein the output from the first object is coupled to the second object via a connection, wherein the output of the first object is converted from a first type to a second type. A method is also provided that includes receiving a signal into a first object, outputting data from the first object, wherein the data has a first type, converting the data into a second type, and receiving the data into a second object.

20 Claims, 6 Drawing Sheets

WEAKLY-TYPED DATAFLOW INFRASTRUCTURE WITH STANDALONE, CONFIGURABLE CONNECTIONS

CROSS REFERENCE TO RELATED APPLICATIONS

This application is a Continuation Application of U.S. patent application Ser. No. 12/239,225, entitled "Weakly-Typed Dataflow Infrastructure with Standalone, Configurable Connections", filed Sep. 26, 2008, now U.S. Pat. No. 8,959,439, which is herein incorporated by reference.

BACKGROUND

The present invention relates generally to the field of interface devices and to their configuration and programming. More particularly, the present invention relates to connection, function and interoperation of objects for interfaces of industrial automation devices.

A wide range of interface devices are known and are presently in use in many different fields. In industrial automation, for example, human machine interfaces or "HMIs" are commonly employed for monitoring or controlling various processes. The HMIs may read from or write to specific registers such that they can reflect the operating state of various machines, sensors, processes, and so forth. The interfaces can also write to registers and memories such that they can, to some extent, control the functions of the process. In monitoring functions alone, little or no actual control is executed. In many other settings similar devices are employed, such as in automobiles, aircraft, commercial settings, and a host of other applications. In many applications, the interface may not communicate with a remote device or process, but may be operated in a stand-alone manner.

In these interface devices, various objects used in the interface may correlate to different controls, monitors, or any other parameter of an industrial automation device. Some of these objects may have visual representations on the interface devices, while other objects may not be visually represented but may be accessible for configuration and programming by a user. A user may desire to manipulate these objects, such as by creating new objects, to create and customize an interface. A user may also create connections between objects, for example, to connect the output of one object to the input of another object. Each object may have numerous connections to any number of other objects.

Conventional control systems and devices may include various types of interfaces, such as discrete, analog, text, and so on. Using objects to design and configure these interfaces may necessitate configuring a type or an object, or a specific type for the output and input. For example, a object dealing with discrete logic types must be connected to another discrete logic object, so that the outputs and inputs of the two objects are compatible. Similarly, devices or objects dealing with an unsigned 16-bit value will not be able to receive a text string as input without additional processing and overhead to handle the conversion from string to unsigned 16-bit. Additionally, the conversion is generally hard-coded and is not adaptable to input types received from other objects or connections. Other systems may force the type of data input to or output from an object. For example, the device or interface may operate on a limited selection of types, and may reject any other connection type. In such systems, a user or designer of an interface must manually convert the data to the acceptable forms, adding design complexity and processing overhead. Such a system also presents maintenance problems, as new object or connection types require the user or designer to manually change the objects or connections to the acceptable types of the present system.

BRIEF DESCRIPTION

The present invention provides a novel approach to interface device management and configuration designed to respond to such needs. The approach uses a plurality of device elements operative on the interface device, such that the device elements may be coupled via connections between device elements. The connections may be weakly types to allow interoperation of different types of device elements, outputs, and inputs. Additionally, the connections may be configured to convert the input and output types, and may manipulate the output or input based on various parameters.

Methods and devices are all supported for performing these and other functions of the invention.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
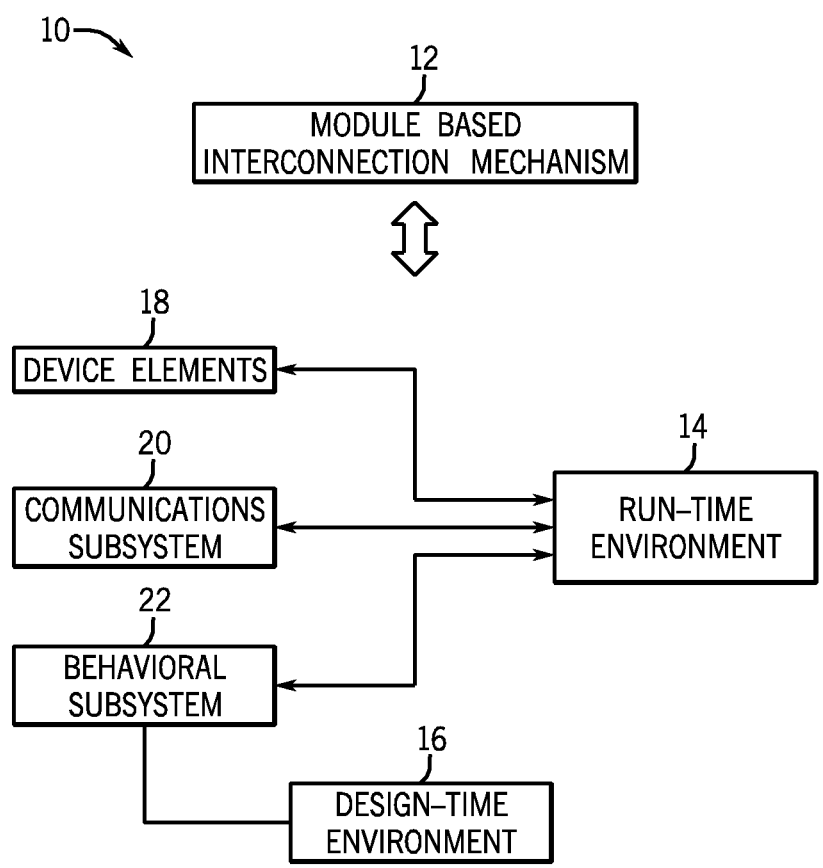
FIG. 1 is a general overview of a framework for an interface configuration system in accordance with certain aspects of the present invention.

A number of facets, components and processes will be described through the following discussion. By way of introduction, a general system overview is in order that situates these innovations in context. FIG. 1 is a diagrammatical representation of an control and monitoring software framework 10 for an interface in accordance with an embodiment of the present invention. The framework 10 facilitates building functional software by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements are provided as stand-alone code that can be individually programmed, pre-written for use, as in a library, customized in their function and appearance in screens, and interconnected to provide information to a user as well as monitoring and control functions.

The framework 10 includes two interrelated software environments that can reside on a single system (e.g., computer). Specifically, A run-time environment 14 enables an operator (e.g., a human user) to interact with an application, such as a process during run-time (e.g., during use of the interface, typically during interaction with or observance of a process in operation). A design-time environment permits a designer to configure the interface and its components. For example, a system may graphically present run-time information to an operator via the run-time environment 14 on a display (e.g., computer or interface device screen). Further, the system may include means (e.g., a keypad) for accepting operator input that can be detected and managed via the run-time environment. The environments interact as described in detail below, in innovative ways to provide greatly enhanced programming and use of the interface.

The run-time environment includes or provides access to device elements 18. The device elements 18 are software components that may include any accessible or configurable element in a software environment. For example, the device elements 18 include software components, such as "ActiveX" controls or ".NET" components that are managed by the run-time environment 14. "ActiveX" and ".NET" refer to object-oriented concepts, technologies and tools. Those skilled in the art will be well-acquainted with such programming approaches generally. In the present context, such standards should be taken as merely examples, and "device elements" should be understood as including any generally similar components or self-sufficient programs that can be run as quasi-independent elements, sometimes referred to as "objects". Other standards and platforms exist for such elements, typically championed by different companies or industry groups.

Because such device elements are basic to certain of the inventive concepts, a few words of introduction are in order. Device elements generally include four features: properties, methods, connections (or connection points) and communications interfaces. Properties are attributes that can be adjusted, such as to define an image or representation of the element in a screen view, as well as its location on the screen, and so forth. A method is an executable function (sometimes referred to herein as the elements "functionality" or "state engine"), and defines an operation performed by execution of the element. A connection is a link between elements, and can be used to cause data (read from a memory or written to a memory) to be sent to another element.

Specific examples of device elements 18 may include software pushbuttons, timers, gauges, PLC communication servers, screens, and applications. In general, virtually any identifiable function may be configured as such an element. Moreover, as discussed below, such elements may communicate with one another to perform a wide range of display, monitoring operations and control functions. It should be noted that device elements 18 do not require special limitations for supporting a design mode. Also, while elements associated with an image are quite useful, particularly for screen views, many elements may not have a visual representation, but may perform functions within an HMI, such as calculations, or even management and data exchange between other elements.

The run-time environment typically operates using a communications subsystem 20. The communications subsystem 20 is adapted to interconnect the device elements 18. In practice, the communications subsystem 20 may be thought of as including the connections of the device elements. However, it may include a range of software, hardware and firmware that send data to and receive data from external circuits, such as PLC's, other computers, networks, satellites, sensors, actuators, and so forth.

The run-time environment typically operates using a behavioral subsystem 22, which is adapted to manage the behavior of the device elements 18. For example, responsibilities of the behavioral subsystem 22 may include the following: place and move device elements, modify device elements, group device elements on interchangeable screens, save and restore screen layouts, manage security, save and restore connection lists, and supply remote access to the run-time environment 14. Here again, in practice, such behaviors may be defined as part of the profile (i.e., the "method" or "state engine") of each device element.

The design-time environment 16 includes an advanced implementation of the behavioral subsystem 22 that facilitates direct or indirect manipulation of the run-time environment 14, without impeding or compromising the behavior of the run-time environment 16. That is, design and reconfiguration can be done even while an interface is operating. The behavioral subsystem 22 extends access to the run-time environment 14 via remote provision of the design-time environment 16, such as in a conventional browser. The behavioral subsystem 22 allows a designer to interact with and change aspects of the run-time environment 14 of an HMI via a remote configuration station by serving the design-time environment or aspects thereof to the configuration station from the HMI. For example, an HMI coupled to a laptop via a network may provide a user with configuration capabilities by serving up a specific design-time environment to the laptop via the network.

Details and examples of how this may be done are provided below. In current embodiments, the design-time environment may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build screen views without prior knowledge of either the functionality of device elements, or their interrelationships.

By facilitating changes to device elements, the design-time environment allows the designer to make interchangeable design-time models or specialized implementations of the behavioral subsystem 22. A specific example of a design-time implementation of the behavioral subsystem 22 includes a Web-based design-time environment, which extends access to a run-time environment on an HMI via a TCP/IP connection between the HMI and a remote device. The Web-based design-time environment facilitates management of the device elements without compromising run-time performance or security. In one specialized implementation the behavioral subsystem 22 gives designers the ability to manipulate aspects of the run-time environment 14 using a Web browser that is capable of accessing a related interface or HMI. As noted above, and as described in detail below this is achieved by using a combination of dynamic content, scripting, and configuration of the device element properties.

Figure 2:
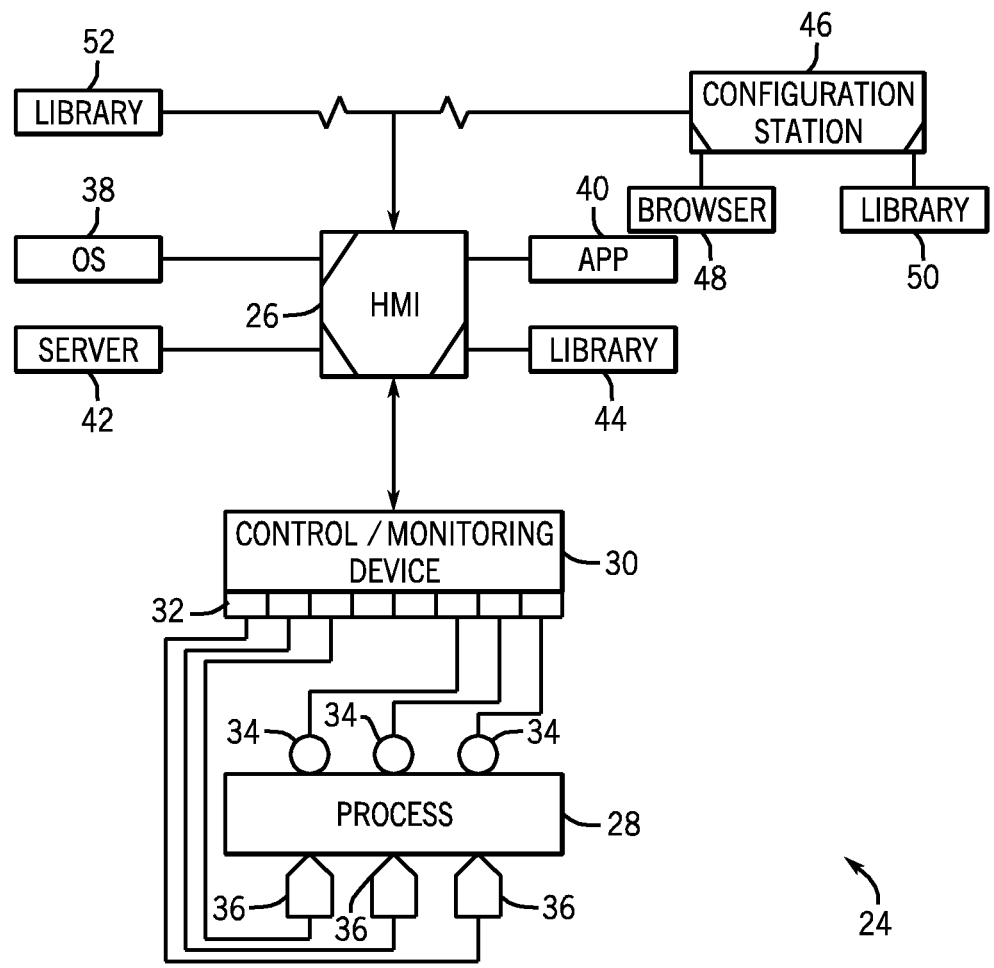
FIG. 2 is a diagrammatical overview an interface for monitoring or controlling a process in accordance with an embodiment of the present invention.

FIG. 2 is a diagrammatical representation of a control and monitoring system 24, such as for industrial automation, implementing the framework described above in accordance with an embodiment of the present invention. The system includes an HMI adapted to interface with networked components and configuration equipment. The system 24 is illustrated as including an HMI 26 adapted to collaborate with components of a process 28 through a control/monitoring device 30 (e.g., a remote computer, programmable logic controller (PLC) or other controller). The HMI 26 may physically resemble existing hardware, such as a panel, monitor or stand-alone device.

Collaboration between the HMI 26 and components of the process 28 may be facilitated by the use of any suitable network strategies. Indeed, an industry standard network may be employed, such as DeviceNet, to enable data transfer. Such networks permit the exchange of data in accordance with a predefined protocol, and may provide power for operation of networked elements. As noted above, while reference is made in the present discussion to networked systems and to systems incorporating controllers and other equipment, the HMI 26 and programming techniques described may be equally well applied to non-networked components (e.g., GPS displays, game displays, cell phone displays) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI. When loaded, the stored application framework may be adapted to create screens and locate user interface device elements (actually images or pictorial representations corresponding to the elements) in the screens. These applications, screens, and user interface elements are each types of device elements. As described below, the HMI 26 includes a stored application that dictates the layout and interaction of the device elements. The Web-based design-time environment, which is based on a run-time engine, is also loaded and resident on the HMI. The design-time environment may be adapted to handle advanced features (e.g., security management) for both design-time and run-time environments.

The HMI may be adapted to allow a user to interact with virtually any process. For example, the process may comprise a compressor station, an oil refinery, a batch operation for making food items, a mechanized assembly line, and so forth. Accordingly, the process 28 may comprise a variety of operational components, such as electric motors, valves, actuators, sensors, or a myriad of manufacturing, processing, material handling and other applications. Further, the process 28 may comprise control and monitoring equipment for regulating process variables through automation and/or observation. The illustrated process 28 comprises sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., a PLC) and may be assigned a particular address in the control/monitoring device 30 that is accessible by the HMI 26. The sensors 34 and actuators 36 may be in direct communication with the HMI 26. These devices may be utilized to operate process equipment. Indeed, they may be utilized within process loops that are monitored and controlled by the control/monitoring device 30 and/or the HMI 26. Such a process loop may be activated based on process inputs (e.g., input from a sensor 34) or direct operator input received through the HMI 26.

The server software on the interface permits viewing of the development environment, and direct reconfiguration of the interface (particularly of the device elements and their associated appearance and functionality) without the need for special viewing or configuration software. This benefit flows from the fact that the device elements and the design-time environment itself is resident in the HMI, and "served up" by the HMI to a browser or other general purpose viewer on the configuration station. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 26, through the programming of the device elements as described below, may be thought of as including instructions for presenting one or more screen views, and device elements executed upon interaction with the HMI by reference to the screen views (e.g., pressing a button, touching a location of a screen, and the like). The screen views and device elements may be defined by any desired software or software package. For example, the screen views and device elements may be called by or executed by an operating system 38. The device elements, as discussed above, in accordance with present embodiments, are objects conforming to ".NET" or "ActiveX" standards. The operating system itself may be based upon any suitable platform, such as Window CE. As referenced herein, the device elements and tools support Web services or technology for transmitting data over networks (e.g., the Internet). These device elements thus follow a set of rules regarding information sharing and are adapted for use with various scripting and programming languages, as described below. Such device elements enable provision of interactive content to outside applications such as a LAN, WAN, an intranet, an extranet, or even the World Wide Web. Accordingly, the operating system 38 and the various device elements facilitate dynamic configuration of the HMI 26 through a browser by allowing configuration access (e.g., serving up) to the browser.

For example, such configuration access includes access for instantiation of device elements. In other words, new device elements can actually be created and implemented from the browser. Again, it should be noted that the browser does not require actual functional access. Indeed, in one embodiment, requests via the browser result in a "draw" sequence of operations based on data functionality and content of device elements in a container, thus allowing illustration of the device element representations and access to their configuration without actually serving up functional aspects. This allows for configuration via a remote workstation without necessitating technical support for the remote workstation. Such aspects are described in greater detail below.

In addition to the operating system and device elements as described above (and as described in greater detail below), the HMI 26 includes an application or application layer 40. The application, which may itself comprise a device element, facilitates access to and acquisition of information from the various device elements of the HMI. In particular, the application 40 represents a first level in a multi-level device element that can be enumerated for execution. The application 40 in a practical implementation may comprise a user application in the form of an XML page. The user application is then interacted with by the user or operator, as well as by the designer as described in greater detail below.

The screen views and device elements may be described as independent executable pieces of software. In a present implementation, the screen views are defined by appropriate code written in a markup language (e.g., Hypertext Markup Language or HTML). Thus, the configuration of graphical interface screens for the HMI 26 may be performed without the use of conversion programs. Further, by programming of the device elements, the screen views may be developed directly on the HMI 26 via resident server software (designated as server 42) that makes the resident development environment available for remote access. Specifically, in one embodiment, representations of certain device elements (e.g., ActiveX controls) are served up to the browser without serving up the software components themselves. Because a development or design-time environment may be accessed via a browser, the need to download changes to the screens and to update remote configuration software applications can be eliminated.

As noted above, device elements may include functionality by which they read from or write to specific memory or registers of memory, typically in other devices (but which could also be within the HMI). For example, a particular function may correspond to writing to or reading from a register 32 of control/monitoring device 30. In a simple case, for example, an object simply accesses a piece of data (e.g., a state of a component as determined by a sensor), and generates an output signal to write a value corresponding to the state of a different networked device. Much more complex functionality can, of course, be configured. In an industrial control and monitoring context, for example, such device elements may emulate operation of a range of physical components, such as a momentary contact push button, a push button with delayed output, a switch, and so forth. Many pre-programmed device elements may be available for use by the HMI 26. Such functional modules may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements may reside on the HMI 26 to facilitate configuration of the HMI 26, as described below. The screen instructions may call upon the device elements for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements associated with the instructions (e.g., with specific locations triggering calls or execution of pre-configured device elements) the desired functions may then be executed. Accordingly, the operator is enabled to interact with a process, typically to change screen views, write to registers, or command the generation of other output or control signals. In a stand-alone implementation, the interactions may simply recall or store data, change screens, and so forth.

One or more separate interface screens may be employed, with some HMIs having many such screens and a great number of device elements. Each device element may, in turn, be uniquely programmed to consider specific inputs, perform specific functions, and generate signals for specific outputs. A plurality of such device elements can be loaded and hosted in a single software "container" (e.g., ActiveX container) as described below.

The HMI may be configured by interacting directly with a panel or screen on the HMI itself (if one is present), but in many cases configuration will be performed from a remote configuration station 46. For example, access is provided directly to the resident library 44 and/or operating system 38 and application 40 via a browser 48 or similar application. In a present implementation, no other specialized software is required at the configuration station 46. Indeed, the server 42 resident on the HMI 26 may provide access to the device elements in library 44. By storing the device elements in library 44 directly on the HMI 26, the risk of version conflicts and so forth are eliminated or reduced. Additionally, the HMI may be directly connected to the configuration station, or accessed by reference to an IP address (Internet Protocol address) assigned to the HMI 26.

Access control schemes may be used to limit the ability to change screens and device elements. For example, a password or user access status may be required to gain such access. Further, in a presently contemplated embodiment, the configuration station automatically recognizes the HMI or the terminal on which the HMI is resident as a device upon being coupled to the configuration station (e.g., similar to an external memory or drive). Thus, once connected to the configuration station, the HMI may simply be "recognized" as a device that can be accessed (providing the configuration screen and tools described below).

Once the device elements then resident on the HMI 26 are accessible to the configuration station 46, aspects of the HMI 26 can be modified or updated directly on the HMI 26 via the communication link from the configuration station 46. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements via the configuration station 46 and use them to modify the HMI graphic or functionality in a development environment.

It should be noted that additional device elements can be added to the library 44. For example, if a trending device element is not resident on the HMI 26, a user can download such an element to the HMI 26 from a configuration library 50 resident on the configuration station 46. Alternatively, a user could access the trending device element from a resource library 52 accessible via a network (e.g., the Internet), either directly to HMI 26 or through the configuration station 46. This may be particularly beneficial because new and improved device elements can be downloaded to the HMI 26 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 26, version conflicts with the embedded code may be avoided and the necessity for configuration station software upgrades may be eliminated.

Figure 3:
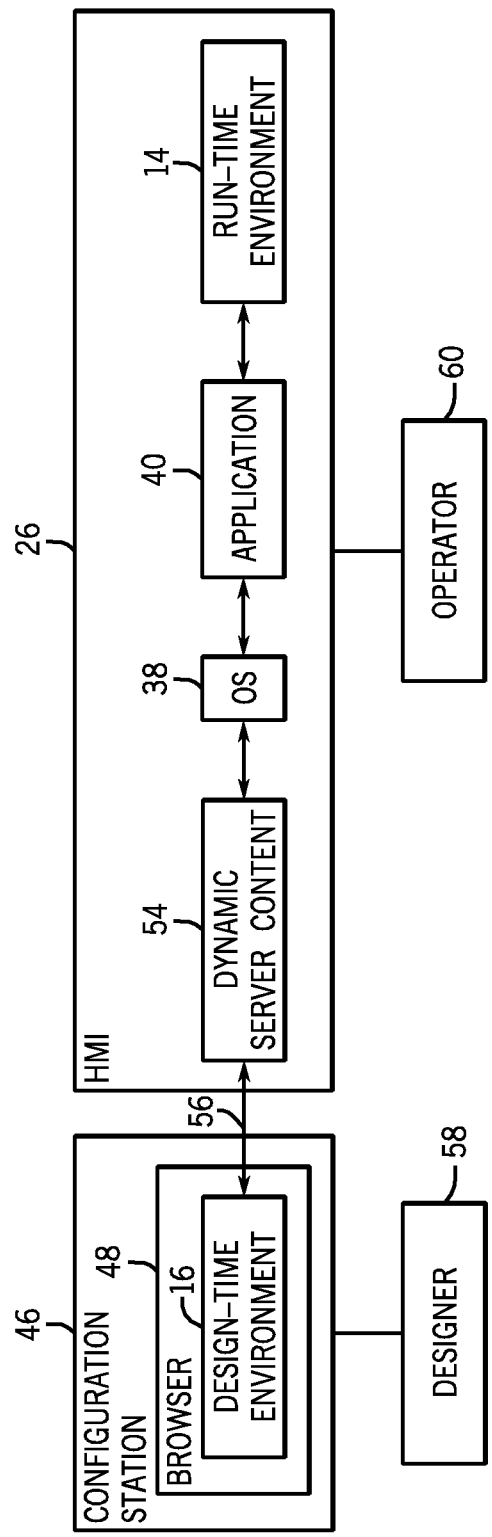
FIG. 3 is an overview of certain of the functional components in an interface and a configuration station in accordance with an embodiment of the present invention.

FIG. 3 is a high-level flow diagram representing interaction between an HMI and a configuration station. More detail regarding such processes is provided below. In general, a platform for the HMI and configuration station will include the operating system or executive software 38, application software 40, as well as any communication software, a microprocessor, a network interface, input/output hardware, generic software libraries, database management, user interface software, and the like (not specifically represented in FIG. 3). In the illustrated embodiment, a design-time platform and a run-time platform interact within the HMI. The design-time platform provides views that are served as the design-time environment 16 to a desktop personal computer platform (e.g., running a suitable operating system, such as Windows XP, Windows Vista, or Linux) and the run-time platform cooperates with the design-time platform via the operating system (e.g., Windows CE, Linux). The design-time platform provides dynamic server content 54, while the run-time platform displays views on the HMI itself (if a display screen is provided on the HMI). The design-time environment 16 is displayed in a browser 48 (e.g., Web browser or other general purpose viewer).

FIG. 3 represents at a very high level how the design-time environment 16 interacts with the operating system 38, application 40 and run-time environment 14. The arrow 56 represents dynamic exchange of content between the HMI 26 and configuration station 46. In general, interaction with the design-time environment is the task of a designer 58 who initially configures the HMI screens or views, device elements, their functions and interactions, or who reconfigures such software. The run-time environment is generally interacted with by an operator 60 directly at the HMI. It should be noted that while the design-time environment 16 has specific needs, in a current embodiment, it depends heavily on the operating system, application and run-time environment. The design-time environment 16 and the run-time environment 14 may utilize certain base technologies (e.g., DHTML, HTML, HTTP, dynamic server content, JavaScript, Web browser) to operate respectively in the design-time platform and run-time platform. While, in the illustrated embodiment, the run-time environment 14 and the design-time environment 26 reside on separate platforms, in some embodiments they may reside on the same platform. For example, the design-time platform and run-time platform may be configured as or considered a single platform.

In one embodiment of the present invention, a design-time Web implementation is utilized. This design-time Web implementation offers the speed and flexibility of software running on the design-time platform by using a Web browser (e.g., 48) with DHTML support from the HMI, as noted by the dynamic server content 54 in FIG. 3 and as described below. DHTML is used to perform dynamic manipulation of Web content in the design-time environment 16. Further, the dynamic server content 54 is used in the HMI to serve dynamic Web content to the design-time environment 16. This dynamic client-server environment allows the Web browser to simulate an application running on the design-time platform without requiring a piece of software compiled for a related processor.

Figure 4:
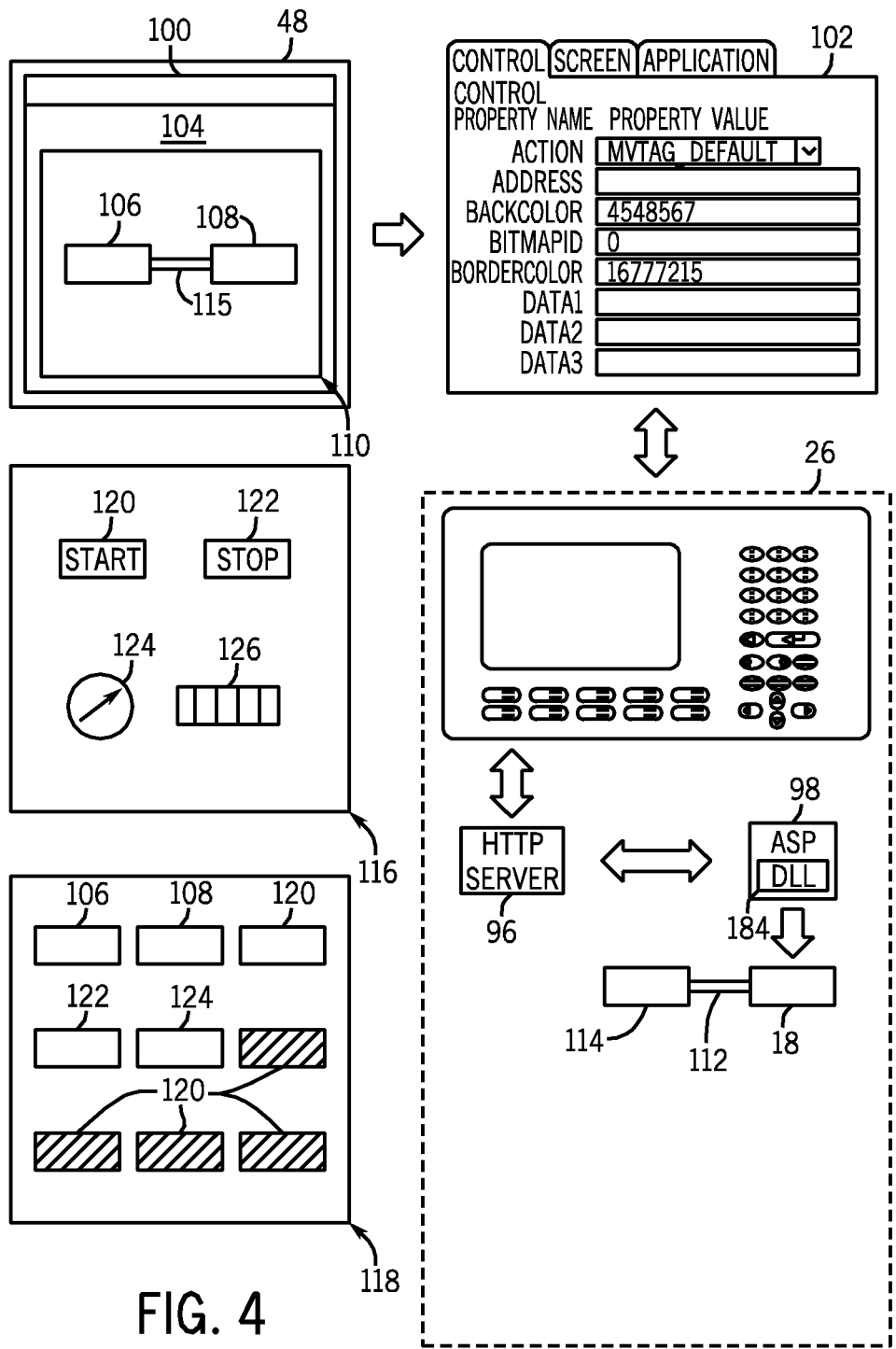
FIG. 4 is an overview of certain views or containers of device elements and connections in accordance with an embodiment of the present invention.

FIG. 4 is a diagram illustrating one or more device elements in a design-time environment in accordance with embodiments of the present techniques. The diagram includes interactions illustrated by relationships between a display 100 (e.g., a screen for browser display), a property editor 102, and an HMI 26.

The design-time environment represented by the configuration screen or display 100 includes static content 104 and dynamic content. The dynamic content includes images corresponding to any displayed or represented device elements 106 (e.g., virtual on/off button, gauge). In one embodiment of the present techniques, the image is specified by an image tag in HTML and is part of a JPEG file created by the HMI as described below. The static content 104 may be created by the ASP server or it may preexist in an HTML file. It should be noted that, in some embodiments, designated designers only can edit the static content 104.

In the representation of FIG. 4, the device element representations 106 and 108 are contained within a view container 110. As illustrated, the device element representation 106 connected to device element representation 108 via a connection 112 between the actual device elements 18 and a device element 114 on the HMI 26. The connection 112 may connect an input or output of device element 18 to the input or output of the device element 114. Each device element may have one or more connections to other device elements, and a user may create or configure these connections by manipulating the visual representation of the device elements and the corresponding connections depicted in the browser 48, such as a visual representation 115. Advantageously, as discussed in detail below, the interconnection infrastructure of the HMI 26 and device 30, and/or the connection 112 may provide for weakly typed connections to allow use of device elements regardless of input and output type.

As will be appreciated by those skilled in the art, a container generally defines a portion of a processing space in which certain device elements are opened and ready for use. The container 110 may thus correspond to a first view container that includes only the elements viewable within the current screen. As discussed above, many such screens may be provided in the HMI. Other screens, such as alternative control or interface screens may be provided in other view containers, such as a container 116. In general, to speed the operation (e.g., changing between screen views) of the HMI, such view containers are predefined and associated with one another by definition of the individual device elements with which they are either associated or within which representations of the device elements are provided. A global container 118 is defined that include all of the device elements necessary for the various view containers, as well as other elements that may not be represented in any view container. As illustrated in FIG. 4, therefore, view container 110 includes the device element 106, the device element 108, and the connection 115, which are manifested by representation in a first screen. New container 116 includes several device elements, such as a "start" button 120, a "stop" button 122, a virtual gage 124 and a digital readout 126. The global container 118, then, will include all of these device elements for the various view containers, as well as any device elements 128 that are required for operation of the viewable device elements but that are not themselves viewable. Such device elements may include elements that perform computations, trending, communications, and a wide range of other functions, and may include a variety of connections to other device elements.

All device elements that are needed for the various views are opened during operation of the HMI and remain open in a single global container 118. However, utilizing aspects of current technologies, known as "tear-offs" any device elements that are not required for viewing or operation of a current view (i.e., a view currently displayed on the HMI or configuration station view) are reduced in size to reduce the memory requirements, processing requirements, and to facilitate operation of the HMI. The "torn-off" device elements nevertheless remain open and active such that change in between screen views is extremely rapid and efficient from memory utilization and processing standpoints.

FIG. 4 also illustrates a property editor 102 in which a user may access various properties of the element 106. Another property editor screen (not shown) may also be used to access various properties of the device element 108, as well as any other device elements configurable by a user. As discussed above, the elements 106 and 108 may also include connections and text associated with the elements 106 and 108 respectively, which may also be configured by the user via an editor, similar to the property editor 102.

In an embodiment, the property editor 102 may interact with the HMI 26 a query string from the browser 48 to a server 96 (e.g., HTTP server) that is resident on the HMI 26. The server 96 cooperates with an ASP server 98 including a dynamic-link library (DLL) 122 to receive and respond to queries. The DLL 184 allows for storage of executable routines as separate files, which can be loaded when needed or referenced by a program. In the example set forth above, upon receiving the call, the page is reloaded by the ASP server 98 and the query string is initially parsed resulting in evaluation of the move command. Server side scripts then access the device element 18 related to the representation 106, and/or device element 114 related to the representation 108, and to update its location property. The new property information is then updated on the page and the page is passed to the browser 48. Similarly, any changes to a connection, such as connection 112, may also be processed in the same manner.

In accordance with the present invention and as illustrated below in FIGS. 5-7, various connections between device elements may provide for a weakly typed system such that a user may configured device elements and connections without concern to the input type or output type of device elements in the interface. In various embodiments, the underlying connection infrastructure may provide for conversion of various types, or the connections themselves include logic configured for specific conversions. In additional embodiments, the connections may provide for modification of inputs and outputs, such as modifying an input to a receiving device element based on an output from another device element.

Figure 5:
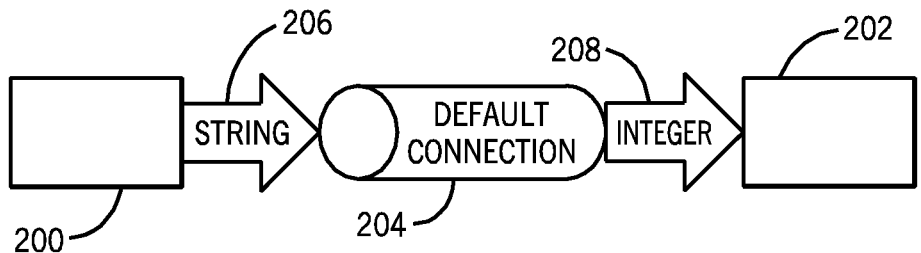
FIG. 5 is an illustration of a default connection between two device elements in accordance with an embodiment of the present invention.

FIG. 5 illustrates a device element 200 connected to a second device element 202 via a default connection 204. The device elements may be stored on an HMI 26, and may have corresponding visual representations on a browser 48 and be a part of a view container 100, as discussed above. As shown in the figure, the output 206 from the device element 200 is of a string type, (e.g., text), which may be encoded as ASCII, UTF-8, or any suitable character encoding. For example, the device element 200 may read a string from a device, such as a serial number or other unique code. Alternatively, the device element 200 could perform any function whose results are suitable for output as a string. In contrast, the device element 206 is configured to receive an integer input 208. For example, the device element 202 may be configured to perform integer math or other processing on the expected integer input 208.

In accordance with an embodiment of the present invention, the device element 200 may be connected to the device element 202 by the default connection 204. The default connection 204 is not uniquely configured to process or convert any specific input types; thus, a user need only select a default connection to connect the input 208 and output 206 of device elements 200 and 202, regardless of the respective input and output types. In this manner, design complexity and overhead is reduced, as a user or designer of an interface is not required to configure any special connections based on device element types. In this embodiment, the underlying connection infrastructure may automatically convert the output data 206 from the device element 200 from a string to an integer, thus allowing the data to be usable by the device element 202. The underlying connection infrastructure may be configured to convert any output type received to any other input type, such as: integer to string, string to float, integer to float, float to integer, integer to Boolean, Boolean to integer, string to Boolean, Boolean to string, float to Boolean, Boolean to float, string to float, float to string, etc. Additionally, the weakly typed connection infrastructure may be configured between different sizes, such as 16 bit integer to 32 bit integer, etc., and may also convert between signed and unsigned types.

Figure 6:
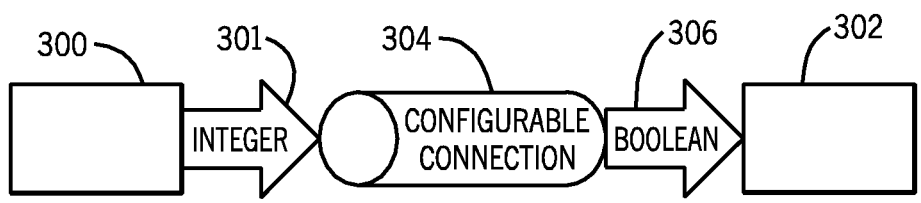
FIG. 6 is an illustration of a configurable connection between two device elements in accordance with an embodiment of the present invention.
Figure 7:
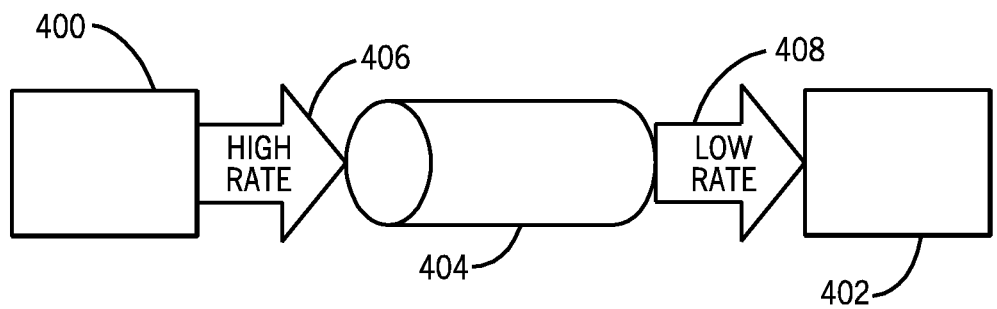
FIG. 7 is an illustration of an active connection between two device elements in accordance with an embodiment of the present invention.

In some embodiments, as depicted in FIG. 6, the connections between device elements may be configurable. For example, as depicted in FIG. 6, a device element 300 may be configured to output an integer value 301, such as from a particular integer function or reading a value from a device 30. The device element 300 may be coupled to another device element 302 by a connection 304. The device element 302 may be of a different type than device element 300; for example, as illustrated in FIG. 6, device element 302 is a Boolean type, such that the device element 302 receives a Boolean input 306 (e.g., TRUE (1) or FALSE (0) values). In such an embodiment, the connection 304 may a unique connector specifically configured to convert a non-zero integer value to a "1" and a zero integer value to a "0." Thus, if a user desires to connect device elements 300 and 302 together, a user may select the connection 300 if this connection evaluates the output of device element 300 in a desired manner. Alternatively, a user may select a default connector in which the type conversion may be performed by the underlying connection infrastructure, as discussed above, as opposed to a specifically configured connecter 304 for the specific types and device elements. In other embodiments, the configurable connection 304 may be configured to perform any conversion between different types.

In some embodiments, a connection between device elements may modify input or output data of a device element in response to various parameters. As depicted in FIG. 7, a device element 400 may be coupled to a device element 402 via connection 404. In this embodiment, the device element 400 may have an output 406, such as data representing a signal from a device 30. In such an embodiment, the connection 404 may behave as an active component instead of providing a passive connection between device elements 400 and 402. For example, the output 406 from device element 400 may be a signal output having a high rate of data flow. In this instance, the connection 404 may be a magnitude throttling connection such that the connection 404 may reduce the rate of data flow proportionally to the magnitude of the data change of output 406. The resulting input signal 408 presents a more manageable input to device element 402 and may require less processing. For example, the magnitude-throttling connection provides for throttling of small magnitude noisy signals while providing for a fast response to large magnitude changes. In other embodiments, various connections having any modification capabilities may be used, such as changing the size of the outputs or inputs, increasing the data rate of an output or input, etc. Advantageously, use of the throttling or other active connections provide easier set up and configuration than use of filtering device elements, which would require additional connections and intermediate device elements.

Figure 8:
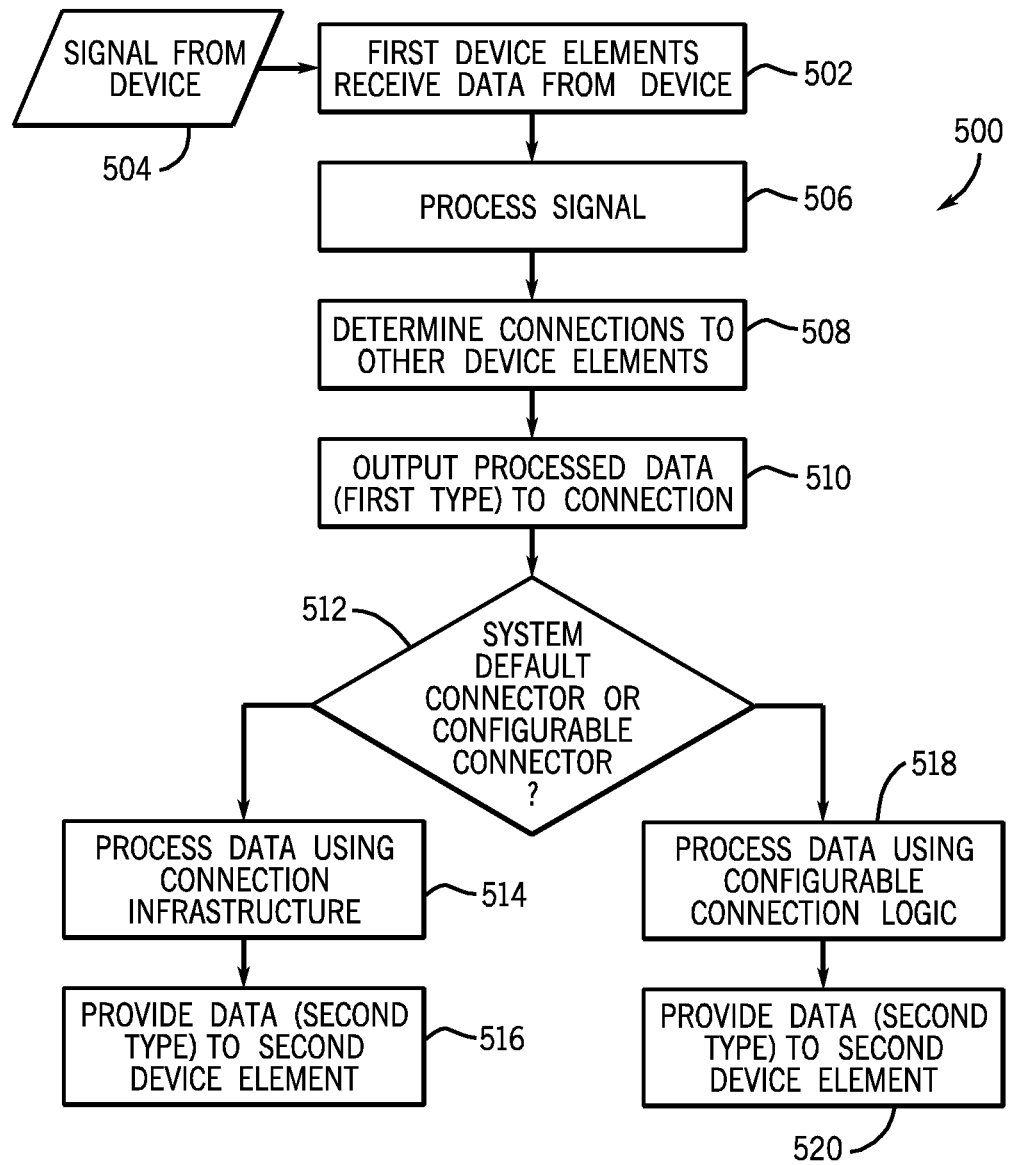
FIG. 8 is a flowchart depicting a process for operating connections between a device elements of an interface in accordance with an embodiment of the present invention

FIG. 8 depicts a process 500 for processing outputs and inputs of device elements and the weakly typed connections. Initially, a first device element may receive data (block 502), such as a signal 504 from a device 30. The first device element may be configured to display, modify, or otherwise process this data before output (block 506). As discussed above, the first device element may include connections to other device elements of an interface. After processing the signal 502, the connections to these other device elements are determined (block 508). The processed data is then output from the first device element to a connection to another device element (block 510). The process checks the connection to determine if the connection is a system default connection or is a specifically configurable connection (decision block 512). If the connection is a system default connection, the process uses the underlying connection infrastructure to process the output from the first data element (block 514), such as by performing a type conversion as discussed above in FIG. 5. Once the connection has processed the output, the data may be provided as an input to a second device element for further processing (block 516).

If the connection is determined to be a specifically configurable connection, then the process uses the conversion or other logic specified by the configurable connection (block 518), as discussed above in FIGS. 6 and 7. After the output has been processed by the configurable connection, the data may be provided as an input to a second device element for further processing (block 520).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An industrial automation system comprising:
   a first industrial automation component having a first processor configured to carry out a first industrial automation task;
   a first object-oriented device element executable by the first processor and having a first input or output type;
   a second industrial automation component having a second processor and configured to carry out a second industrial automation task;
   a second object-oriented device element executable by the second processor and having a second input or output type;
   wherein each of the first and the second object-oriented device elements comprises a plurality of properties, the first object-oriented device element being configured to perform the first industrial automation task by processing data based on the first input or output type, and the second object-oriented device element being configured to perform the second industrial automation task by processing data based on the second input or output type; and
   and wherein the second object-oriented device element is programmable to receive, selectively as its input data one of the set of: the same input data as the first object-oriented device element, and output data of the first object-oriented device element.

2. The system of claim 1, wherein when executed, the first object-oriented device element is configured to define a first visual representation and the second object-oriented device element is configured to define a second visual representation, wherein the first visual representation and the second visual representation are configured to be displayed on different industrial automation devices.

3. The system of claim 1, wherein the first input or output type and the second input or output type each comprises one of a text string, an integer, a floating point number, or a Boolean type.

4. The system of claim 1, wherein the first and second object-oriented device elements perform their respective industrial automation tasks based upon the same input or output data.

5. The system of claim 1, wherein:
   the first object-oriented device element is configured to output data of the first input or output type; and
   the second object-oriented device element is configured to input data of the second input or output type, wherein the data output by the first object-oriented device element is converted to the second type and input to the second object-oriented device element.

6. The system of claim 5, wherein the conversion is performed by a default connection.

7. The system of claim 5, wherein the conversion is performed by a configurable connection.

8. The system of claim 5, wherein the conversion is performed by a magnitude throttling connection.

9. The system of claim 1, wherein the first object-oriented device element is configured to interact with the first industrial automation component to perform the first industrial automation task.

10. The system of claim 1, wherein the first object-oriented device element is configured to interact with the first industrial automation component by sending data to or receiving data from the first industrial automation component.

11. The system of claim 1, wherein at least one of the first object-oriented device element and the second object-oriented device element is configured to emulate operation of a physical component in the industrial automation system.

12. The system of claim 11, wherein the physical component comprises a contact push button, a push button with delayed output, or a switch.

13. An industrial automation system comprising:
   a first industrial automation component having a first processor configured to carry out a first industrial automation task;
   a first object-oriented device element executable by the first processor and having a first input or output type, the first object-oriented device element being executable to generate at least part of a first visual representation of at least a part of the industrial automation system;
   a second industrial automation component having a second processor and configured to carry out a second industrial automation task; and a second object-oriented device element executable by the second processor and having a second input or output type, the second object-oriented device element being executable to generate at least part of a second visual representation of at least a part of the industrial automation system; and and wherein the second object-oriented device element is programmable to receive, selectively as its input data one of the set of: the same input data as the first object-oriented device element, and output data of the first object-oriented device element.

14. The system of claim 13, wherein the first and second object-oriented device elements perform their respective industrial automation tasks and generate their respective visual representations based upon the same input or output data.

15. The system of claim 13, wherein the first input or output type and the second input or output type each comprises one of a text string, an integer, a floating point number, or a Boolean type.

16. The system of claim 13, wherein:
the first object-oriented device element is configured to output data of the first input or output type; and
the second object-oriented device element is configured to input data of the second input or output type, wherein the data output by the first object-oriented device element is converted to the second type and input to the second object-oriented device element.

17. The system of claim 13, wherein at least one of the first object-oriented device element and the second object-oriented device element is configured to emulate operation of a physical component in the industrial automation system.

18. The system of claim 17, wherein the physical component comprises a contact push button, a push button with delayed output, or a switch.

19. A tangible, non-transitory, computer readable medium storing instructions executable by one or more processors, wherein the instructions comprises instructions to:
execute, via a first industrial automation component having a first processor configured to carry out a first industrial automation task, a first object-oriented device element having a first input or output type, the first object-oriented device element being executable to generate at least part of a first visual representation of at least a part of the industrial automation system; and
execute, via a second industrial automation component having a second processor and configured to carry out a second industrial automation task, a second object-oriented device element having a second input or output type, the second object-oriented device element being executable to generate at least part of a second visual representation of at least a part of the industrial automation system; and
and wherein the second object-oriented device element is programmable to receive, selectively as its input data one of the set of: the same input data as the first object-oriented device element, and output data of the first object-oriented device element.

20. The computer readable medium of claim 18, wherein the first and second object-oriented device elements perform their respective industrial automation tasks and generate their respective visual representations based upon the same input or output data.

* * * * *